United States Patent Office 2,793,621
Patented May 28, 1957

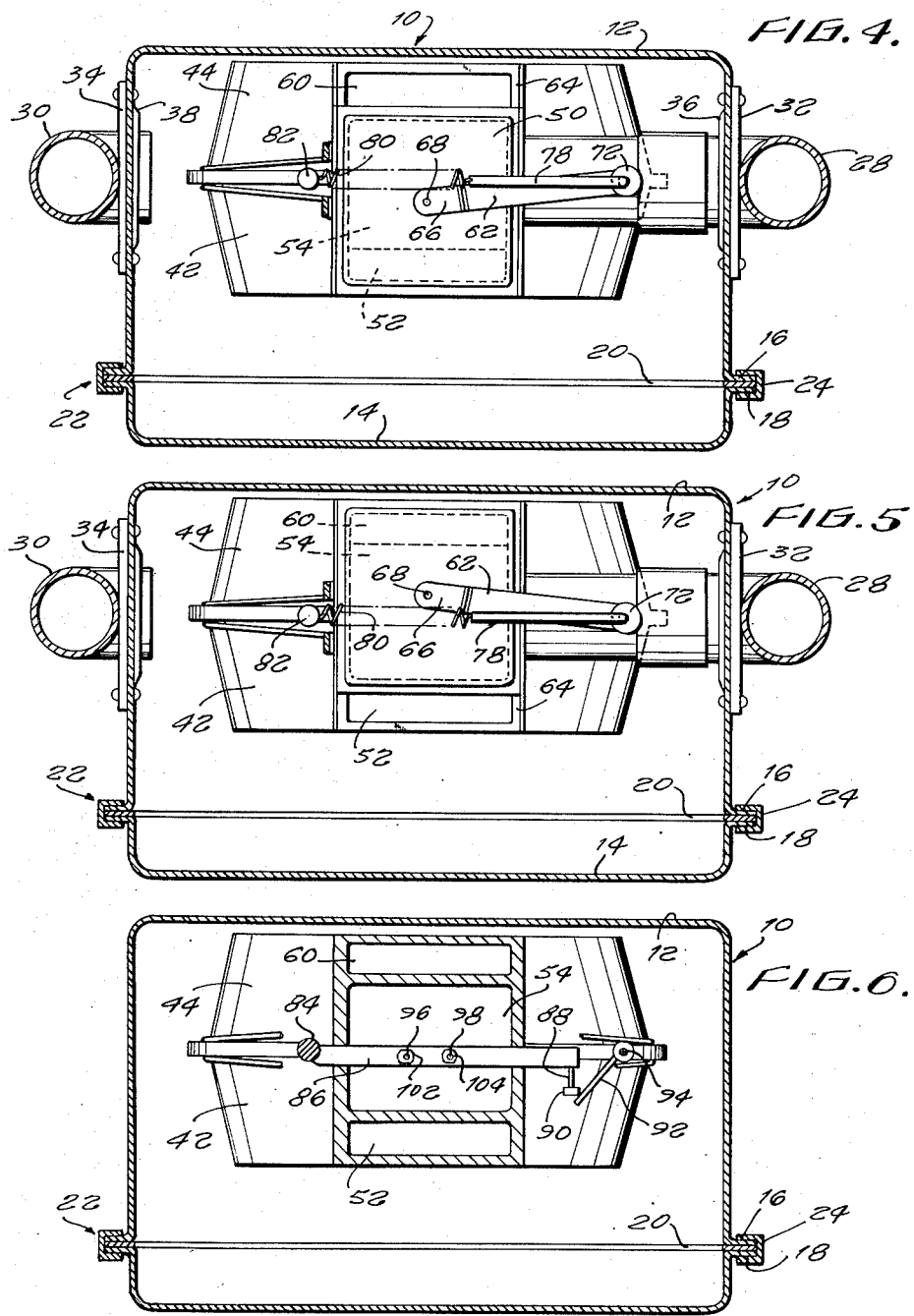

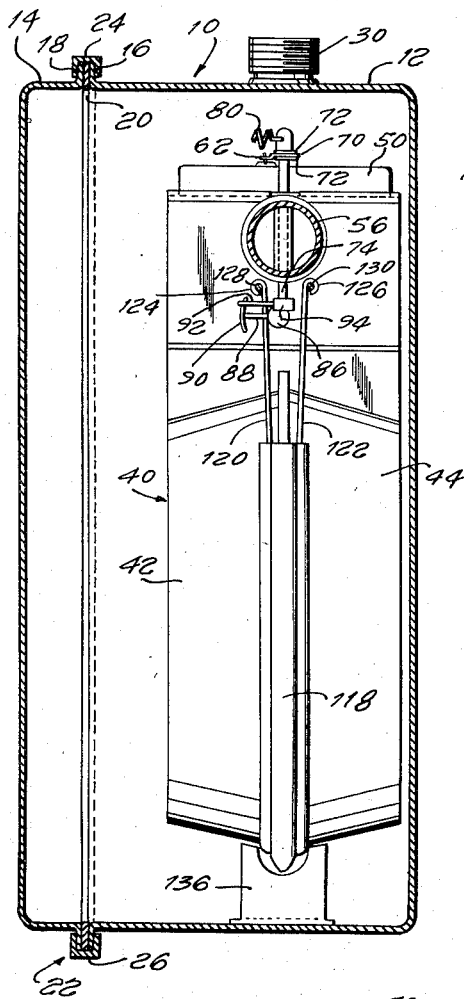
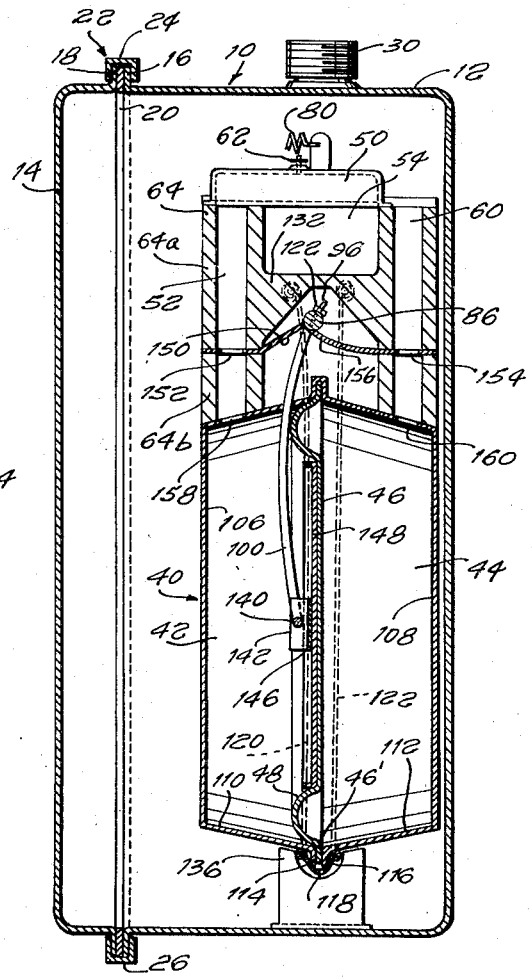
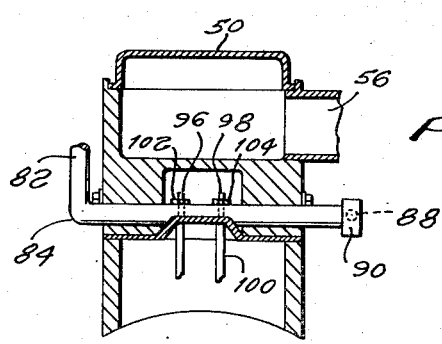

2,793,621

HIGH CAPACITY GAS METER

Werner L. Aron, New York, N. Y., assignor to Aronco Meter Products Corporation, New York, N. Y., a corporation of New York Application September 8, 1953, Serial No. 378,848

8 Claims. (Cl. 121—48)

The present invention relates to gas meters, and more particularly to gas meters having two chambers with a common wall formed by a flexible element.

It is an object of the present invention to extend the period of accurate registering time of the gas meter.

It is another object of the present invention to eliminate the use of soldered seams and the necessity of utilizing packing glands of the conventional type. The present invention allows to reach a uniformity of workmanship which is not attainable with soldering and packing operations which are subject to the individual and differing techniques employed by workmen.

It is a further object of the present invention to provide a gas meter which will not fall apart if subjected to temperatures exceeding the melting point of soft solder.

The present invention eliminates the packing gland arranged on the shaft and transmitting motion from the diaphragm to the valve-tripping mechanism, at the same time preventing gas from passing from one compartment to another. This is accomplished according to the present invention by leading a lever which actuates a tripping mechanism through a thin leather sheet which is attached to the lever in gas-tight manner. Furthermore, this same leather sheet is located close to the fulcrum of the shaft which the lever actuates and extends over the whole surface of the lower part of the valve seat assembly and is compressed between this part and the upper part of the valve seat, thus acting as a gasket at the same time maintaining the valve seat apertures necessary for the conduction of the gas stream. Special play and elasticity are provided in the leather sheet near the points where the lever passes through it. In this manner, the lever which transmits the motion of the diaphragm to the shaft and operates the tripping motion, is in mechanical connection with the other compartments of the meter, but separated from them in a gas-tight manner. A rigid connection to the lever is substituted for the present packing and accompanying lubricants hitherto required around the rotating shaft, thus obviating problems of accuracy and durability always present with conventional packing glands hitherto used in the traditional gas meters.

The present invention permits the shaft, rotated by a diaphragm motion, to be set in conventional bearings in the valve seat assembly.

One end of the main spring of the tripping mechanism is attached to an upright right angle extension of the rotating shaft, whereas the other end is connected with the terminal of a horizontal extension of the shaft which has its perpendicular fulcrum on the center line of the outlet of the valve seat.

At the end opposite the upright right angle extension of the rotating drive shaft, a double-armed cam arrangement is attached which releases the valve shifting lever after a full stroke of the diaphragm has been completed. The movement of the sliding valve takes place as the result of a snap action initiated by the main spring of the tripping mechanism. Thereby, the flow is reversed, thus permitting the gas already filling the measured side of the diaphragm to be exhausted to the outlet of the meter while the opposite side of the diaphragm is filled with gas being measured. This operation is alternated by the valve movement so that gas flow to the outlet of the meter is obtained as a continuous function.

By this arrangement, the many parts hitherto required for a metering system are reduced to a minimum. In like manner, the space required for mechanical parts and that required for functional movement is considerably reduced.

The valve is kept in close contact with its seat by pressure of a flat spring applying its tension to the center of the valve and attached to a perpendicular axis in the outlet.

The valve being subjected to this spring pressure, cannot be displaced from its seat as is possible and likely when meters are transported to or from their designated locations.

In addition, other hazards of transportation are overcome by setting the entire measuring chamber assembly and its attendant mechanism in three rubber shock blocks, the contours of which match the circumference of the measuring chamber assembly. The measuring chamber consists of two pan-shaped members with peripheral flanges. These flanges are pressed together against the meter diaphragm, which acts as a gasket, by a V-shaped band which clamps the flanges together through pressure applied to two wires arranged in suitable recesses in the V-shaped band and being concentric to it. The ends of the wires are drawn together by threaded bolts located in the upper section of the valve assembly. Application of pressure by means of these bolts transmits a concentric pressure by the wires against the V-shaped band, thus forcing the flanges of the measuring chamber members against the diaphragm gasket. At the same time, the upper member of the valve assembly is drawn against the lower member, the leather sheet being located between the upper and lower members. By the same action the lower surface of the valve assembly is made to tightly contact the measuring chamber, thus making the entire assembly compact and gas-tight.

The outer casing of the gas meter consists of two halves with flanges extending around the entire circumference thereof. The flanges of the two halves are joined by and held together against, a gasket of rubber-lined asbestos by a U-shaped band, thus making a gas-tight connection and at the same time preventing the escape of gas in the event of fire.

The inlet and outlet pipes are attached to one half of the meter housing by means of rivets drawing the pipes against rubber-lined asbestos gaskets laid between the pipes and the metal surface of the housing. This type of construction guards against fire hazards and, at the same time, avoids the use of a soft solder for joining purposes. It is a common occurrence with meters of the conventionally soldered type to separate when in proximity to fires.

The only gas connection between the outer housing of the meter and the inner measuring chamber is by means of a rubber hose-like section connecting the exhaust chamber of the valve seat assembly to the outlet pipe. Thus is obtained an entirely resilient setting of the measuring chamber, valve seat assembly and mechanical system within the meter housing so as to avoid the danger and subsequent inaccuracy of performance usually caused by handling and transportation of the gas meter.

In the drawings affixed to this specification and forming part thereof, an embodiment of a gas meter according to the present invention is shown by way of example. In the drawings:

Fig. 2 is a sectional elevation of the meter shown in Fig. 1 along the plane 2—2 of Fig. 1;

Fig. 3 is a section of the meter shown in Fig. 1 in the plane 3—3 of Fig. 1;

Fig. 4 is a horizontal section of the meter shown in Fig. 1 in the plane 4—4 of Fig. 1;

Fig. 5 shows the parts shown in Fig. 4 in a different end position thereof;

Fig. 6 is a horizontal section of the meter shown in Fig. 1 in the plane 6—6 of Fig. 1; and Fig. 7 is an elevational section of certain parts shown in Figs. 1 and 6.

Figure 1:
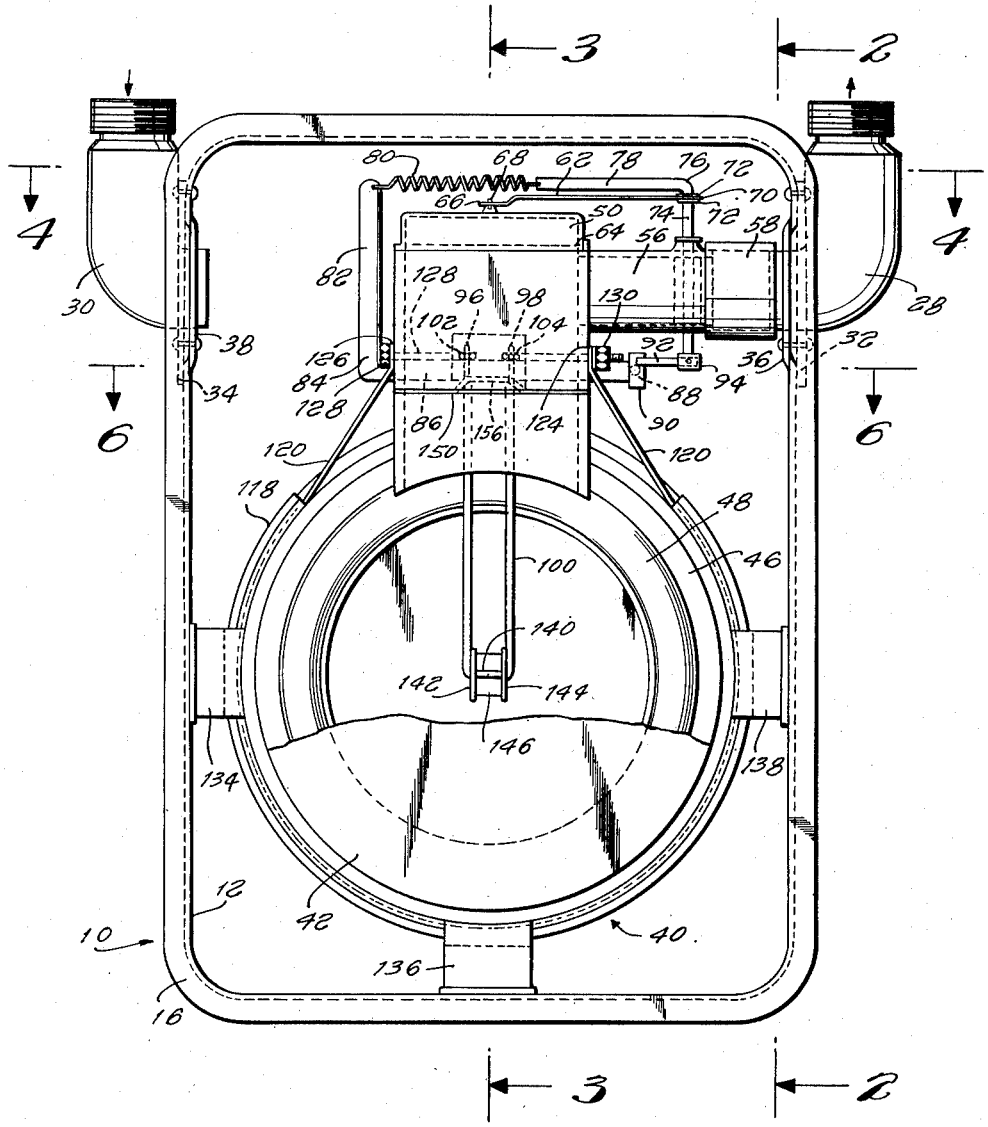
Fig. 1 is a front elevation of a gas meter according to the present invention, the front of the housing and part of the front of the measuring chamber being removed, in order to show clearly the inner parts thereof.

Referring now to the drawings and first to Figs. 1–3, 10 is a housing consisting of two unequal halves 12 and 14 having flanges 16 and 18, respectively, having equal sizes so that the halves 12 and 14 can be arranged with the flanges 16 and 18 thereof abutting against each other so as to form a juncture of the two halves 12 and 14. A gasket 20 consisting of rubber-lined asbestos or the like is arranged between the two flanges 16 and 18 so as to render the juncture of the two halves 12 and 14 gastight and fireproof. A U-shaped band 22, preferably comprising two sections 24 and 26, presses the flanges 16 and 18 tightly together along the entire circumference of the two halves 12 and 14 of the housing 10.

A gas outlet pipe 28 and a gas inlet pipe 30 are rigidly connected by the rigid connections 36 and 38, respectively, with the larger half 12 of the housing 10. Rubber-lined asbestos gaskets 32 and 34 are associated, respectively, with the rigid connections 36 and 38 so as to render the same fireproof.

Inside the first half 12 of the housing 10 is arranged a metering device 40 including a first chamber 42, a second chamber 44 having a wall 46 in common with the first chamber 42, and a diaphragm 48 arranged so as to form part of the common wall 46 of the first and second chambers 42 and 44, together with the common wall 46 is movable between a first position and a second position and is shown in Fig. 3 as occupying a mid position between the first and second positions thereof.

A valve 50 (see also Figs. 4 and 5) is arranged above the two chambers 42 and 44 and is movable between a first end position thereof shown in Figs. 3 and 4, and a second end position thereof shown in Fig. 5, in a direction parallel to the movement of the diaphragm 48 and the common wall 46. Means to be described in more detail hereinafter are provided for imparting an instantaneous movement of the valve 50 from one of the two end positions to the other of the two end positions thereof, and vice versa, the valve 50 in the first and second end positions thereof communicating respectively with the first and second chambers 42 and 44.

In the position shown in Figs. 3 and 4 the valve 50 connects a first manifold channel 52 (see also Fig. 6) connected to the first chamber 42 with a centrally arranged manifold channel 54 connected by a pipe 56 and a flexible connection piece 58 with the outlet pipe 28, a second manifold channel 60 connected to the second chamber 44 being open to the interior of the housing 10 connected to the inlet pipe 30.

In the position shown in Fig. 5, however, the valve 50 connects the centrally arranged manifold channel 54 with the second manifold channel 60 connected to the second chamber 44, whereas the first manifold channel 52 is in communication with the interior of the housing 10.

Thus it is seen that the manifolds 52, 54, and 60 form a valve seat assembly block 64 arranged with the upper surface thereof for cooperation with the valve 50 which is held in close contact with said surface by a leafspring 62 one end 66 of which engages a pin 68 arranged at the center of the top face of the valve 50 so as to exert a pressure on the center of the valve 50. As shown in Fig. 1, the other end 70 of the leaf spring 62 is firmly held between two flat discs 72 firmly attached to the vertical arm 74 of a first angular lever 76 having a horizontal arm 78, the end of which is connected to one end of a helical spring 80 and the other end of which is attached to the end of the vertical arm 82 of a second angular lever 84, the horizontal axle 86 of which carries at its end a pin 88 having a curved cam 90 as best shown in Fig. 2, the curved cam 90 being in engagement with a small rod 92 attached to the end piece 94 of the vertical arm 74 of the first angular lever 76.

The horizontal axle 86 of the second angular lever 84 is provided with two borings for receiving the reduced end portion 96 and 98 of a curved stirrup or lever 100. Nuts 102 and 104 are screwed to the reduced end portion 96 and 98 in order to firmly secure the same in the two borings of the horizontal axle 86. In this manner it is accomplished that the end portions 96 and 98 of the curved stirrup or lever 100 are firmly connected to the axle 86 so that the movements of the lever 100 to be described more in detail hereinafter are transferred to the axle 86 as rotations about the axis thereof, thus rotating the curved cam 90 acting upon the small rod 92 causing a rotation of the end piece 94 and the vertical arm 74 of the first angular lever 76 which causes a corresponding rotation of the leaf spring 62 about the end 70 thereof by which the valve 50 is made to move from the end position thereof shown in Fig. 4 to the end position shown in Fig. 5, and vice versa. It should be understood that these movements are carried out suddenly since the horizontal arm 78 of the first angular lever 76 is connected with the vertical arm 82 of the second angular lever 84 by the helical spring 80.

The wall portions of the first and second chambers 42 and 44 apart from the common wall 46 and the diaphragm 48, are formed as hollow conical shells, respectively, having flat faces 106 and 108 arranged substantially parallel to, and at a distance from, the common wall 46, conical faces 110 and 112, and rim portions 114 and 116 arranged oppositely to each other so as to clamp between them the marginal portion 46' of the common wall 46. In order to hold the walls of the first and second chambers 42 and 44 together, a band 118 being V-shaped in cross section extends around the rim portions 114 and 116 except the upper parts thereof, and is held in position by two wires 120 and 122 the looped ends 124 and 126 of which are held by screw bolts such as 128 and nuts such as 130. The screw bolts such as 128 pass through the middle part 132 of the valve seat assembly blocks 64 (Fig. 3). In order to center the metering device 40 in the housing 10, rubber blocks 134, 136, and 138 are provided having contours matching the circumference of the metering device 40.

The curved stirrup or lever 100 is provided with a mid-portion 140 engaging two lateral slots arranged opposite to each other in the lateral walls 142 and 144 of a box-like structure 146 attached to the center of a rigid circular plate 148 rigidly connected with the common wall 46 so as to move with the latter.

Furthermore, a leather gasket or sheet 150 is provided with two openings fitting over the end portions 96 and 98 of the lever 100 and is thus secured in a gastight manner to the lever 100 in close proximity to the shaft 86 forming the fulcrum thereof. It should be noted that the leather sheet 150 has a portion 156 arranged adjacent to the lever 100 and being near the fulcrum thereof which is sufficiently loose and elastic to permit moderate circular movements of the lever 100 about the fulcrum thereof. The leather sheet 150 extends through the walls of the first and second manifolds or channels 52 and 60 comprising valve seat assembly block 64, and is provided with apertures 152 and 154 for the flow of gas through the manifolds or channels 52 and 60. Thus it is seen that the leather sheet 150 subdivides the valve seat assembly block 64 into an upper portion 64a forming the valve seat proper, and a lower portion 64b forming the connecting piece with the first and second chambers 42 and 44, with which it communicates through openings 158 and 160, respectively.

The operation of this device is as follows:

The valve 50 being in the position shown in Figs. 3 and 4 connects the first chamber 42 with the central manifold channel 54 and thus with the pipe 56, the flexible connection piece 58, and the outlet pipe 28; on the other hand, the inlet pipe 30 is connected through the second manifold channel 60 to the second chamber 44. When gas is allowed to enter the meter through the inlet pipe 30, it exerts a pressure (which is directed toward the left in Fig. 3) on the common wall 46 and the diaphragm 48. In consequence thereof, the common wall 46 is displaced toward the left in Fig. 3 and swings the lever or stirrup 100 about the shaft 86 as its fulcrum. At the same time any gas filling the first chamber 42 is emptied through the valve 50 and the outlet pipe 28. When the common wall 46 has reached the left end position thereof, the curved cam 90 connected thereto releases the rod 92 thus allowing a rotation of the vertical arm 74 of the first angular lever 76, causing a rotation of the leaf spring 62 about the end 70 thereof which is transmitted through the other end 66 thereof to the pin 68 secured to the top face of the valve 50 which is suddenly moved from the end position shown in Fig. 4 to the end position shown in Fig. 5. In consequence thereof, the second chamber 44 is connected with the central manifold 54 and thus with the outlet pipe 28, the first chamber 42 communicating through the first manifold channel 52 with the inlet pipe 30 so that the gas is fed to the first chamber 42, whereas the gas present in the second chamber 44 is allowed to escape through the outlet pipe 28. Thus it is seen that the valve 50 is moved suddenly when the diaphragm 48 and the common wall 46 have reached their end positions, rendering one of the volumes of the first and second chambers 42 and 44 a minimum and the other volume a maximum. The movements of the diaphragm are registered by a counter (not shown).

In a general manner, while I have in the above description disclosed a preferred embodiment of my invention, it should be well understood that I do not wish to be limited thereto. Other modes of applying the principle of the invention may be employed, changes being made as regards the arrangement, disposition and form of the parts described, provided the features stated in any of the following claims or the equivalent of said be employed.

What I claim is:

1. A high capacity gas meter comprising, in combination, a system of measuring chambers, consisting of a first and second chamber, said chambers being of equal shape and having a wall in common; a diaphragm forming a part of said common wall and being movable between a first and a second position in said system; channels and ducts for the inflow and outflow of the gas to be measured, symmetrically connected with each of said chambers; a valve seat assembly for controlling the inflow and outflow of the gas to and from said chambers, said valve seat assembly comprising a manifold block formed with a central manifold channel communicating with one of said ducts for the outflow of gas, a first and second manifold channels, each adjacent opposite sides of said central manifold channel, said central manifold channel and said first and second manifold channels comprising an upper portion with a top formed as a valve seat, a lower portion consisting of an extension of said first and second manifold channels and communicating respectively with the first and second of said chambers, a shaft rotatively mounted and having its fulcrum substantially centrally between said first and second manifold channels, a leather sheet inserted transversely between said upper and lower portions and provided with apertures, said apertures corresponding precisely to said first and second manifold channels of said valve seat assembly to allow the flow of gas therethrough, a lever secured with one end to the said diaphragm and with its other end to the said shaft and to said leather sheet, adjacent the said fulcrum of said shaft in a gastight manner, a valve slidably mounted on said valve seat for alternately communicating the said first and second manifold channels with the said central manifold channel, a spring holding said valve in close contact with said valve seat, and a valve tripping mechanism cooperating with said diaphragm, said lever and said valve for alternately communicating said first and second manifold channels and said first and second chambers with said central manifold channel.

2. A gas meter as claimed in claim 1, said first and second chambers having flanges arranged oppositely to each other, a V-shaped band covering said flanges for nearly half their circumference, and two wires connected to said V-shaped band and holding the same in position on said flanges of said first and second chambers, said two wires being tensioned so as to pull the upper portion of said valve seat assembly against the lower portion thereof, said portions being arranged so that said leather sheet is located between the same, said leather sheet having a sufficiently loose and elastic portion to permit moderate circular movements of said lever near the fulcrum thereof.

3. A gas meter as claimed in claim 2, an exhaust port in said central manifold channel of said valve seat assembly, said exhaust port having a longitudinal center line, a reversing lever for said valve, and a perpendicular axle being set in said longitudinal center line of said exhaust port, said reversing lever being arranged for rotation on said perpendicular axle.

4. A gas meter as claimed in claim 3, a housing including two halves having flanges, respectively, and a U-shaped band pressing tightly together said flanges of said halves of said housing along the entire circumference thereof.

5. A gas meter as claimed in claim 4, said U-shaped band comprising two sections.

6. A gas meter as claimed in claim 5, and a gasket consisting of rubber-lined asbestos and arranged between said two flanges of said two halves of said housing in order to render the juncture of said two halves gastight and fireproof.

7. A gas meter as claimed in claim 6, inlet and outlet pipes rigidly connected with said housing, and rubber-lined asbestos gaskets associated, respectively, with said rigid connections of said inlet and outlet pipes with said housing so as to render said connections fireproof.

8. A gas meter as claimed in claim 7, and rubber blocks arranged at right angles to said flanges of said halves of said housing and being compressed by the pressure exerted on said first and second chambers, said rubber blocks setting said first and second chambers and said valve tripping mechanism in said housing.

References Cited in the file of this patent

UNITED STATES PATENTS

| | | |
|---|---|---|
| 65,994 | Blakeslee | June 25, 1867 |
| 143,390 | Telling | Sept. 30, 1873 |
| 572,414 | Dixon | Dec. 1, 1896 |
| 621,460 | Murphy | Mar. 21, 1899 |
| 663,079 | Hunter | Dec. 4, 1900 |
| 1,684,850 | Skinner | Sept. 18, 1928 |
| 2,377,699 | Klimkiewicz | June 5, 1945 |

FOREIGN PATENTS

| | | |
|---|---|---|
| 961,216 | France | Nov. 14, 1949 |
| 633,197 | Great Britain | Dec. 12, 1949 |